| United States Patent [19] | [11] Patent Number: 4,873,124 |
| --- | --- |
| Chaudhry | [45] Date of Patent: Oct. 10, 1989 |

[54] HEAT STABLE PREPASTES FOR WALLCOVERINGS

[75] Inventor: Arshad-Ul-Haq Chaudhry, Wellingborough, England

[73] Assignee: Scott Bader Company Limited, Wellingborough, England

[21] Appl. No.: 206,274

[22] Filed: Jun. 14, 1988

[30] Foreign Application Priority Data

Jun. 16, 1987 [GB] United Kingdom ............... 8714056

[51] Int. Cl.$^4$ ........................... B05D 3/02; B05D 5/10
[52] U.S. Cl. ................................... 427/207.1; 156/71; 427/389.9; 427/391
[58] Field of Search .................. 427/207.1, 389.9, 391; 156/71

[56] References Cited

U.S. PATENT DOCUMENTS 4,355,073 10/1982 Knightley .................. 427/207.1 X
4,710,422 12/1987 Fredenucci .................. 427/391 X
4,713,264 12/1987 Clarke et al. .............. 427/389.9 X

FOREIGN PATENT DOCUMENTS 0008213 2/1980 European Pat. Off. .
0077618 4/1983 European Pat. Off. .
2054628 2/1981 United Kingdom .

Primary Examiner—Michael Lusignan
Attorney, Agent, or Firm—Cushman, Darby & Cushman

[57] ABSTRACT

A method of producing a prepasted wallcovering comprises applying to a substrate a paste composition comprising a water-in-oil emulsion of a water-soluble polymer which is essentially wholly anionic but contains a small amount of crosslinking residues derived from a polyfunctional monomer. The composition additionally contains a surfactant and has a pH of at least 7.

The method is especially applicable to the production of prepasted wallcoverings which require a subsequent heat treatment step, the composition being designed to withstand temperatures of at least 200° C.

21 Claims, No Drawings

HEAT STABLE PREPASTES FOR WALLCOVERINGS

This invention relates to prepasted wallcoverings, particularly those that are paper based or backed, which after coating with paste are subjected to a heating process as found in the production of blown (foamed) vinyl or heat embossed wallpaper.

Prepastes are applied to the non decorative side of the wallcovering during manufacture as a non tacky, non-blocking coating. The adhesive is activated by immersion in water immediately prior to hanging the covering on the wall.

Traditional materials for making prepastes include modified natural polymers such as carboxymethyl cellulose, dextrin and starches. However, these materials, once exposed to temperatures within the range of 170°–250° C. typically found in the above processes, lose their potential adhesive properties. Carboxylated high molecular weight acrylic copolymers as used in the alkali activated emulsion process, the more recent water swellable polymers described in EP-A-No. 0008213 and the acrylamide based copolymers described in GB-A-No. 2054628, all fail to retain satisfactory adhesive properties after heating.

EP-A-No. 00077618 teaches that a blend of water swellable, but insoluble, anionic and cationic polymer particles have some degree of thermal stability when used as a prepaste. However, such non-aqueous dispersions in a practical application are far from ideal, producing dust and resulting in a prepaste of an adhesive performance inferior to the water soluble coating described in GB-A-No. 2054628.

Due to the limitations of presently available products in respect of slip, open time, permeability, freedom from curl and adhesion, the wall covering industry still requires a thermally stable adhesive for prepaste coatings.

Surprisingly we have discovered that essentially totally anionic synthetic polymers, preferably having a water solubility greater than 99% at ambient temperature, are thermally stable at temperatures of up to 250° C. and that these polymers can be formulated into excellent wallcovering prepaste compositions.

The polymers are present in water-in-oil emulsions, which polymer emulsions may be conveniently made by inverse emulsion polymerisation techniques. Useful anionic monomers are ethylenically unsaturated carboxylic and sulphonic acids generally in the form of the non-volatile water soluble alkali, especially alkali metal, and preferably the sodium, salt. Suitable acids are 2-acrylamido-2-methyl propane sulphonic acid, allyl sulphonic acid, crotonic acid, itaconic acid, and preferably acrylic and methacrylic acids. Monomers may be polymerised singly or in combination. Each polymer formulated contains residues derived from a small amount of crosslinkable monomer, typically no more than 1%, especially no more than 0.2%, by weight of total polymer, the quantity of which crosslinking agent is used to regulate the degree of adhesion and the open (working) time of the activated paste. Concentration of the crosslinking agent can be altered directly by changes in the formulation or indirectly by preparing two polymers one with crosslinking monomer and one without, then blending the two in the proportions necessary to give the required properties.

The molecular weight of the polymer will be high, preferably of the order of 500,000 or greater, preferably 1,000,000 or greater.

The pH of a composition in accordance with the invention should be at least 7, preferably within the range 7–13.5, and especially 7.5–9, so that at least some, and preferably all, of the ethylenically unsaturated acid residues of the anionic polymer are in the form of their alkali salt. In order to achieve this, at least some alkali is added to the water-in-oil polymer emulsion before its preparation by the abovementioned inverse emulsion polymerisation technique.

Further alkali may be added after its preparation if necessary

The composition additionally contains at least one surfactant which may simply be added to the water-in-oil polymer emulsion.

Thus, a composition in accordance with the invention may be prepared by polymerising, using the inverse emulsion polymerisation technique, the essentially wholly anionic, highly crosslinked, polymer to form a water-in-oil emulsion of the polymer, and adding thereto a surfactant and, if necessary, alkali.

By such an inverse emulsion polymerisation technique, a high molecular weight polymer may be provided in solution in the aqueous medium of the water-in-oil emulsion.

In accordance with a method of the invention, a prepasted wallcovering is produced by applying to a substrate suitable for covering a wall a paste composition having a pH of at least 7 and comprising a water-in-oil emulsion containing a water-soluble polymer being essentially wholly anionic but containing a minor amount of crosslinking residues derived from a polyfuctional monomer.

By use of a water-in-oil emulsion a high solids content material of comparatively (to a solution) low viscosity can be conveniently applied to the wallcovering by coating, for example, by any of the established techniques using, e.g. an air knife, roller, size press or rotary screen.

Typical coating weights are from 3 to 8 g/m² depending upon the method of coating. For example, for an air knife coating technique a suitable weight is 4–5 g/m².

The coating is capable of withstanding high temperatures and the method of the invention is especially suitable for preparing prepasted wallcoverings the production of which requires a heat treatment step carried out at a temperature of at least 200° C., for example, a heat embossed, or blown (foamed) vinyl, wallpaper.

In such a method the wallcovering bearing the paste may be heat treated directly so that, simultaneously, the wallcovering is dried and subjected to the heat treatment step Alternatively, the wallcovering may be dried, preferably at a temperature of from 100°–180° C., more preferably 125°–160° C., for example, 130°–150° C., inclusive, to provide the prepasted wallcovering.

As a still further alternative the wallcovering, after drying within the abovementioned temperature range of 100°–180° C., may be subjected to a subsequent heat treatment step at a temperature of at least 200° C.

On drying and/or heat treating, a coating is formed which, on a microscopic scale is discontinuous and thus will have little tendency to cause curl and will have good air permeability.

On immersion in water, the coating is activated so as to provide an excellent adhesive.

On such immersion in water, the adhesive activation rate is determined by the rate of water absorption of the coating which is controlled by the choice and amount of surfactant in the prepaste composition. The surfactant preferably has a high hydrophile/lipophile balance (HLB) value, i.e. above 7.

Typically the surfactant would be used in the formulation within the concentration range of 0.005 to 5% by weight of the total composition. Typical surfactants are ethoxylated nonyl phenols and octyl phenol polyethoxy-ethanol.

The following Examples illustrate the invention.

EXAMPLE 1 (Best Method)

water in oil (inverse) emulsion was made from sodium acrylate crosslinked with 0.015% by weight of methylene-bis-acrylamide by the well known inverse polymerisation technique. The emulsion was adjusted to a pH of about 8.5 by the addition of sodium hydroxide and 3%, by weight of the total composition, of surfactant Ethylan BCP®, a nonyl phenol ethylene oxide condensate of HLB value 12.9, was added.

EXAMPLE 2

For comparision, an emulsion of a polymer containing a large quantity of non-ionic residues was prepared by the same method as that described in Example 1 The emulsion contained the same surfactant in the same concentration as that of Example 1. The emulsion was made from equal weights of acrylamide and acrylic acid, neutralized with sodium hydroxide and crosslinked with 0.007% by weight of methylene-bis-acrylamide, this amount being proportional to the quantity of ionic residues in the copolymer.

EXAMPLE 3

The emulsion prepared in Example 1 was coated at a concentration of 5 g/m$^2$ onto a base wallpaper and dried at 150° C. for 3 minutes to remove all volatile solvent and water. Coated paper was immersed in water for 30 seconds and applied to a plastered wall. After allowing to dry at ambient temperature for 48 hours, the adhesion was tested by attempting to peel the paper from the wall. The paper held firm and would not peel from the wall.

EXAMPLE 4

The emulsion prepared in Example 2 was tested by the method described in Example 3. The result was the same, i.e. adhesion was maintained.

EXAMPLE 5

Example 3 was repeated with the following addition to the process. After drying at 150° C. and before immersion in water the coated paper was heat treated for 60 seconds at 215° C. When the adhesion of paper to wall was tested, the paper remained stuck to the wall.

EXAMPLE 6

The emulsion prepared in Example 2 was tested by the method described in Example 5.

When tested the adhesive failed allowing the paper to be peeled from the wall.

I claim:

1. A method of producing a prepasted wallcovering, which method comprises applying to a substrate suitable for covering a wall a paste composition comprising a water-in-oil emulsion containing effective amount of a water-soluble polymer, and a surfactant, the water-soluble polymer being essentially wholly anionic but containing a minor amount of crosslinking residues derived from a polyfunctional monomer, and the paste composition having a pH of at least 7.

2. A method according to claim 1, which includes the additional step of heat treating the substrate bearing the paste composition at a temperature of at least 200° C.

3. A method according to claim 1, which includes the additional step of drying the substrate bearing the paste composition.

4. A method according to claim 3, wherein the drying is carried out at a temperature of at least 10020 C.

5. A method according to claim 2, which includes the additional step of drying the substrate bearing the paste composition at a temperature of from 100° to 180° C. inclusive, which said drying step is carried out prior to the said heat treatment step.

6. A method according to claim 1, wherein the paste composition is applied to the substrate by a coating technique.

7. A method according to claim 1, wherein the essentially wholly anionic polymer comprises residues of an ethylenically unsaturated acid selected from carboxylic and sulphonic acids at least a proportion of which residues are in the form of an alkali metal salt thereof.

8. A method according to claim 7, wherein the ethylenically unsaturated said acid residues are selected from acrylic and methacrylic acid residues.

9. A method according to claim 8, wherein at least a proportion of the said acid residues take the form of a sodium salt thereof.

10. A method according to claim 1, wherein the minor amount of crosslinking residues derived for the polyfunctional monomer is not more than 1% by weight of the total weight of the polymer.

11. A method according to claim 10, wherein the minor amount of the said crosslinking residues is not more than 0.2% by weight of the total weight of the polymer.

12. A method according to claim 1, wherein the polyfunctional monomer is methylene-bis-acrylamide.

13. A method according to claim 1, wherein the pH of the paste composition is from 7.5 to 9 inclusive.

14. A method according to claim 1, wherein the surfactant has a hydrophile/lipophile balance of at least 7.

15. A method according to claim 1, wherein the surfactant is present in the composition in an amount, by weight of the total weight of the composition, of from 0.005 to 5%.

16. A method according to claim 1, wherein the polymer is present in the composition in an amount, based on weight of solid polymer by weight of the total composition, of from 15 to 55%.

17. A composition for a prepasted wallcovering, the composition comprising a water-in-oil emulsion containing effective amounts of a water-soluble polymer, and a surfactant, characterised in that the composition has a pH of at least 7 and the water-soluble polymer is essentially wholly anionic but contains a minor amount of crosslinking residues derived from a polyfunctional monomer.

18. In a method of producing a prepasted wallcovering, which method comprises applying to a substrate suitable for covering a wall a paste composition comprising a water-in-oil emulsion containing effective amounts of a water-soluble polymer, and a surfactant, the improvement comprising applying, as the paste composition, one which has a pH of at least 7 and in which the water-soluble polymer is essentially wholly anionic but contains a minor amount of crosslinking residues derived from a polyfunctional monomer, whereby the composition is capable of forming a microscopically discontinuous coating on the substrate and the coating is capable of withstanding a heating temperature of at least 200° C.

19. A composition for a prepasted wallcovering, the composition comprising a water-in-oil emulsion containing effective amount of a water-soluble polymer, and a surfactant, the water-soluble polymer being essentially wholly anionic but containing a minor amount of crosslinking residues derived from a polyfunctional monomer, and the paste composition having a pH of at least 7, whereby the composition is capable of forming a microscopically discontinuous coating on the substrate and the coating is capable of withstanding a heating temperature of at least 200° C.

20. A prepasted wallcovering comprising a substrate and a dry coating, the coating being for activation as an adhesive paste for the substrate by immersion in water, and the coating having been applied as a paste composition comprising a water-in-oil emulsion containing effective amounts of a water-soluble polymer, and a surfactant, the water-soluble polymer being essentially wholly anionic but containing a minor amount of crosslinking residues derived from a polyfunctional monomer and the paste composition, when applied to the substrate, having a pH of at least 7, whereby the composition, on said drying, forms a microscopically discontinuous coating on the substrate and the coating is capable of withstanding a heating temperature of at least 200° C.

21. A prepasted wallcovering according to claim 20, which is a heat-treated said wallcovering, the heat treatment having been carried out at a temperature of at least 200° C.

* * * * *

UNITED STATES PATENT AND TRADEMARK OFFICE
CERTIFICATE OF CORRECTION

PATENT NO. : 4,873,124

DATED : October 10, 1989

INVENTOR(S) : CHAUDHRY et al.

It is certified that error appears in the above-identified patent and that said Letters Patent is hereby corrected as shown below:

Column 3, line 15, before "water", insert --A--.

Column 4, line 13, change "10020 C" to --100° C--.

Signed and Sealed this

Nineteenth Day of November, 1991

Attest:

HARRY F. MANBECK, JR.

*Attesting Officer*     *Commissioner of Patents and Trademarks*